United States Patent [19]
Casco et al.

[11] 3,782,692
[45] Jan. 1, 1974

[54] FIXED SPOOL WINCH MECHANISM

[75] Inventors: Ernest L. Casco; Ralph F. Kosic, both of San Diego, Calif.

[73] Assignee: General Dynamics Corporation, San Diego, Calif.

[22] Filed: Feb. 7, 1973

[21] Appl. No.: 330,372

[52] U.S. Cl. .......... 254/139, 242/54 R, 242/84.21 R
[51] Int. Cl. ............................................ B66c 23/60
[58] Field of Search ..................... 242/54 R, 84.2 G, 242/84.21 R; 254/139, 168

[56] References Cited
UNITED STATES PATENTS
3,545,693  3/1968  Gurner ............................. 242/54 R

*Primary Examiner*—Evon C. Blunk
*Assistant Examiner*—H. S. Lane
*Attorney*—John R. Duncan et al.

[57] ABSTRACT

A winch having a spool on which a line or cable is wound for subsequent free-fall deployment of a payload such as a profiling oceanographic sensor. The line secures at one end to the sensor, passing through the hollow center of the spool shaft, level winding onto the spool, and attaches at its opposite end to surface electronics aboard a data station buoy. Upon activation, a motor rotates a bail platform about the spool shaft axis. A bail carried on the rotating platform engages a striker, pivoting the bail to to one side of the line whereby the weight of the sensor tensions the line to unwind it from the spool in a free-fall manner. When deployed, the sensor is supported by structure above the winch with the line passing freely through the spool shaft.

Retrieval of the sensor is effected by reversing the direction of rotation of the bail platform and shifting the striker linkage to pivot the bail for rewind of the line onto the spool. The bail is thus pivoted through an arc intersecting the vertical axis of the spool shaft, to pick up the deployed line for winding onto the spool as the bail rotates. Level wind of the line is accomplished by reciprocal up and down movement of the spool as the line traverses the sheave of the rotating bail.

16 Claims, 5 Drawing Figures

PATENTED JAN 1 1974   3,782,692

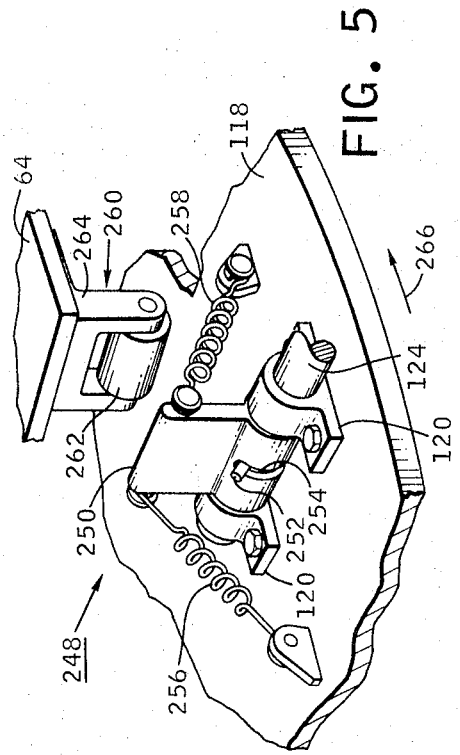
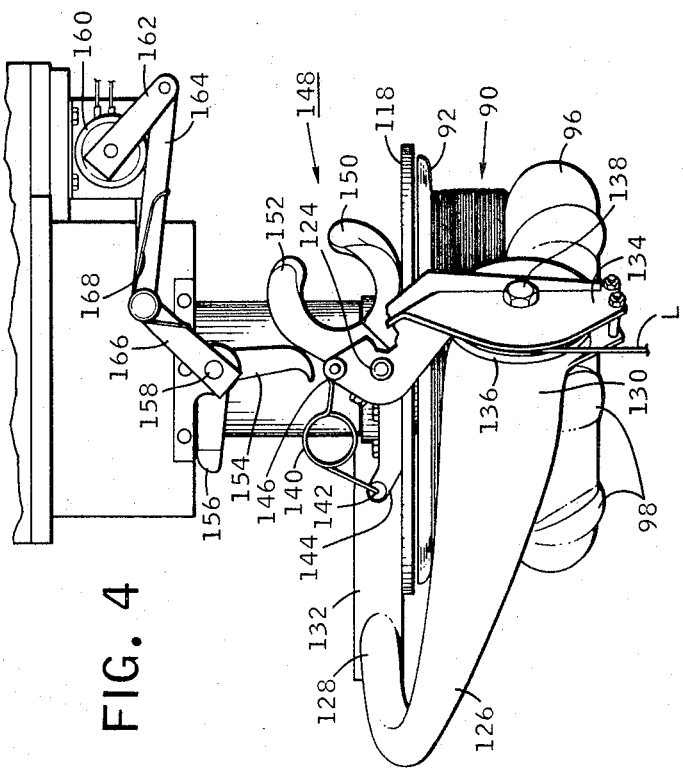
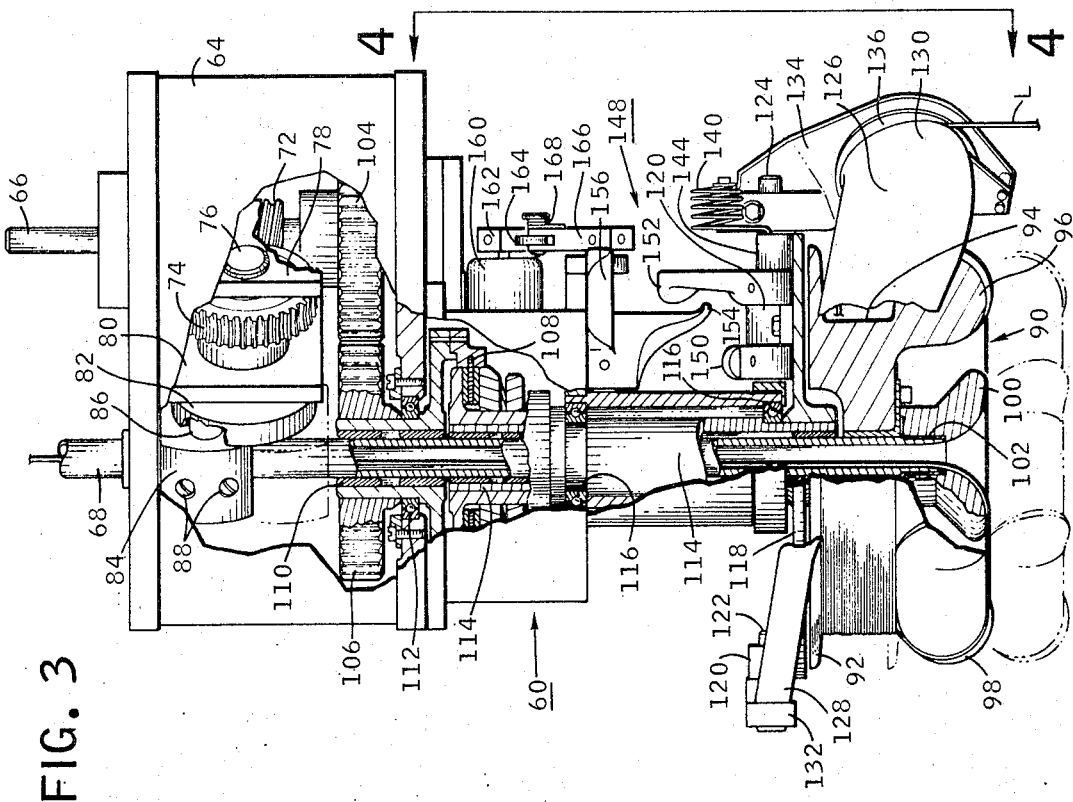

FIXED SPOOL WINCH MECHANISM

BACKGROUND OF THE INVENTION

In probing the ocean depths for scientific and operational data, profiling sensor devices are frequently utilized to collect pertinent information concerning temperature and salinity at various pressure depths for transmission to electronic instrumentation via a line conductor located aboard a crew-operated ship. Recent advances in the sensor art have made it possible to conduct experiments and collect these data through transmission of information from instrumentation aboard unmanned buoys. The buoys, or ocean data stations, are provided with surface electronics from which the sensor depends by a cable conductor or line having opposite ends thereof attached to the sensor and surface electronics respectively. Thus continuous oceanographic measurements are recorded as the sensor descends from the ocean surface to a depth of approximately 500 meters. After reaching the programmed depth, the sensor is retrieved by a winch mechanism. This cycle is automatically repeated several times daily with the aid of an electronic control sequencer.

When a measurement profile is to be obtained, the ocean data station's acquisition and control system sends a command to activate the profiling oceanographic sensor surface electronics. The surface electronics activates the oceanographic sensor surface electronics. The surface electronics activates the oceanographic sensor and automatically deploys and retrieves it. As the sensor descends, it gathers a continuous profile of measurements and transmits the data to the surface electronics. The surface electronics formats the data and transmits it to the data acquisition and control system upon receipt of a data request. After retrieving the oceanographic sensor, the surface electronics configures the system in a standby mode in readiness for the next deployment command, thereby completing one measurement cycle.

In order to minimize measurement anomalies, provide vertical synchronization, and avoid interaction with the ocean data station mooring line, the profiling oceanographic sensor is preferably permitted to descend in a rapid, free-fall mode. If desired, the deploying and retrieving mechanism may incorporate a snubber capable of arresting the travel of the sensor over a distance of 3 or 4 feet when the line is taut in order to effect a gradual deceleration of the sensor. The line or cable conductor serves in a dual capacity, i.e., for signal transmission and for deploying and retrieving the sensor. In its functioning as a signal conductor, it is preferred to connect opposite ends of a continuous, unbroken, line directly from the surface electronics to the sensor. This construction insures reliability and reduces the possibility of malfunctioning as a result of weak signal transmission or complete interruption as may occur in slip ring type electrical connections.

SUMMARY OF THE INVENTION

The present invention is concerned with a winch adapted to deploy and retrieve an object or payload such as a profiling oceanographic sensor, in a substantially vertical plane. The winch utilizes a spool or reel having a vertically oriented axis. The spool is mounted on a tubular shaft through which a line or cable conductor passes without physical attachment to either spool or shaft. One end of the line connects to the sensor and the opposite end to surface electronics carried a buoy or ocean data station. A motor couples to the spool shaft through transmission gearing to reciprocate the spool up and down for level winding the line onto the hub of the spool. Winding of the line is accomplished by a rotating bail. The substantially C-shaped bail is pivotally journaled at opposite ends in bearings carried on a plate or platform. The plate is a disk-like element positioned directly above the spool where it secures to the lower end of a tubular bail shaft. The bail shaft is telescopically journaled around the spool shaft. A frame and gear box structure houses the transmission gearing and supports both spool and bail shafts. The bail shaft is rotated about its vertical axis through a geared connection with the motor drive. A slip clutch secured to the bail shaft is interposed between the transmission and the bail plate to prevent line overload during retrieval or rewind operations.

Pivotal movement of the bail to pick up the deployed line is achieved through a novel bail and striker arrangement. A pair of striker plates pivotally depending from frame mounted bearings are linked to a rotary actuator. Activation of the actuator extends one of the striker plates into the path of a striker which projects upwardly from a journaled end of the bail. The bail is rotated into line deployment and line retrieval positions by rotation of the bail shaft. Rotation of the bail shaft in one direction trips the bail to its line deployment or release position by engagement of a striker secured to the bail with its corresponding striker plate. With the bail pivoted to one side of the vertical axis of the shaft, the line falls free of the spool until arrested by reason of its attachment to structure above the winch. Line retrieval is effected by reversing the direction of rotation of the bail shaft and activating the striker plate actuator to retract the extended striker plate and extend the other striker plate into the path of its corresponding striker projecting from the journaled end of the bail. A torsion spring connected between the bail plate and the bail, assists in maintaining the bail in both line deploy and line retrieval positions by overcenter action.

Although not a part of the present invention, limit switches or the like may be included in the circuitry controlling the motor drive. Thus when the winch is adapted for automatic operation such as aboard an unmanned buoy, the circuit energizing the motor drive is automatically interrupted, arresting operation of the winch upon retrieval of the sensor into the well of the buoy hull.

An object of the present invention is to provide a winch embodying means to rapidly deploy and retrieve a cable or line having its ends remote from and unattached to said winch.

Another object of this invention is to provide a winch having spool and bail means adapted to permit free gravity fall deployment of the winch line and positive retrieval of said line.

Still another object of this invention is to provide a winch adapted to pivot a bail into a line deployment position by rotation of the bail in one direction, and pivot said bail into a line retrieval position by rotation of said bail in an opposite direction.

Yet another object of this invention lies in a winch having a bail adapted to be maintained in line retrieval position by tension force exerted on the bail.

BRIEF DESCRIPTION OF THE DRAWING

FIG. 3 is an enlarged view of the winch viewed in the direction of the arrow 3 of FIG. 2 with portions thereof broken away and in section to facilitate the illustration.

FIG. 4 is a side elevational view of the winch viewed in the direction of the arrow 4 of FIG. 3, and FIG. 5 is a fragmentary perspective view of a modified form of bail striker mechanism of the present invention.

DETAILED DESCRIPTION OF THE INVENTION

Figure 1:
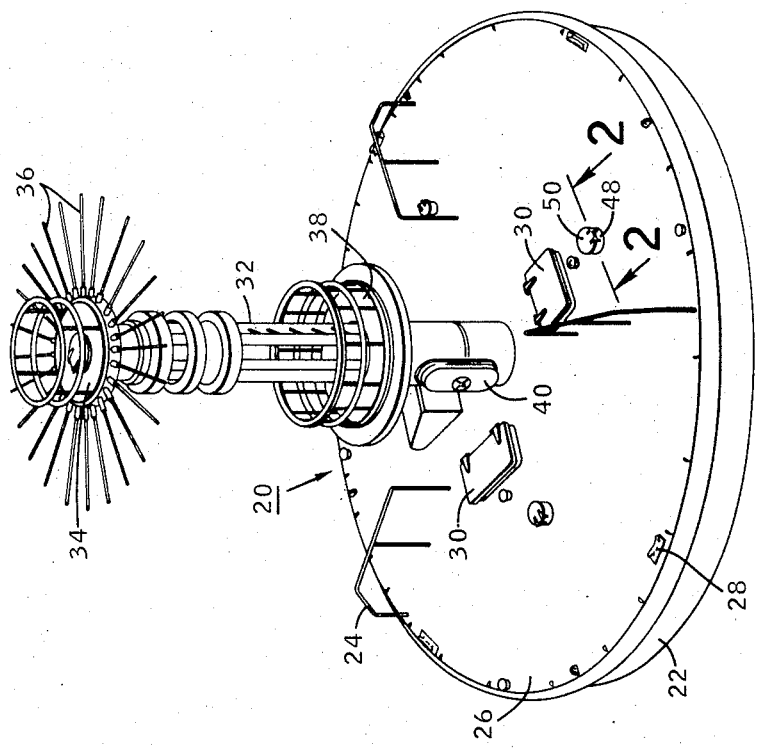
FIG. 1 is a perspective view of an ocean data station buoy embodying the winch of the present invention.

The novel construction of the winch of the present invention has particular utility in ocean data station buoys where a network of such buoys are stationed within ionospheric transmission range of shore data centers. FIG. 1 illustrates a typical ocean data station buoy of a type employing a winch to automatically deploy and retrieve a profiling oceanographic sensor at regular programmed intervals. It is to be noted, however, that the winch of the present invention is not limited to buoy installations, as it is contemplated that the benefits afforded by the novel winch construction may be enjoyed in other applications as well, e.g., cranes, helicopters, ships, etc. Thus for purposes of illustration only, the buoy is depicted herein as a typical example of an installation embodying a winch of the type hereinafter described in detail.

An ocean data station buoy generally designated by the numberal 20 comprises a discus-shaped hull 22 having handrails 24 mounted on the deck 26 thereof. Mooring fittings 28 secured to the deck 26 provide means for mooring boats during servicing and maintenance operations. Watertight compartments (not shown) within hull 22 are provided with access hatches 30 on the deck 26 through which the electronic equipment, generators, etc. are made accessible. A superstructure 32 projecting above the deck 26 supports a meteorological upper sensor platform 34, antenna 36, lower meteorological platform 38, and an access door 40 at deck level providing access means to the interior of the superstructure for servicing the meteorological sensors and related equipment.

Figure 2:
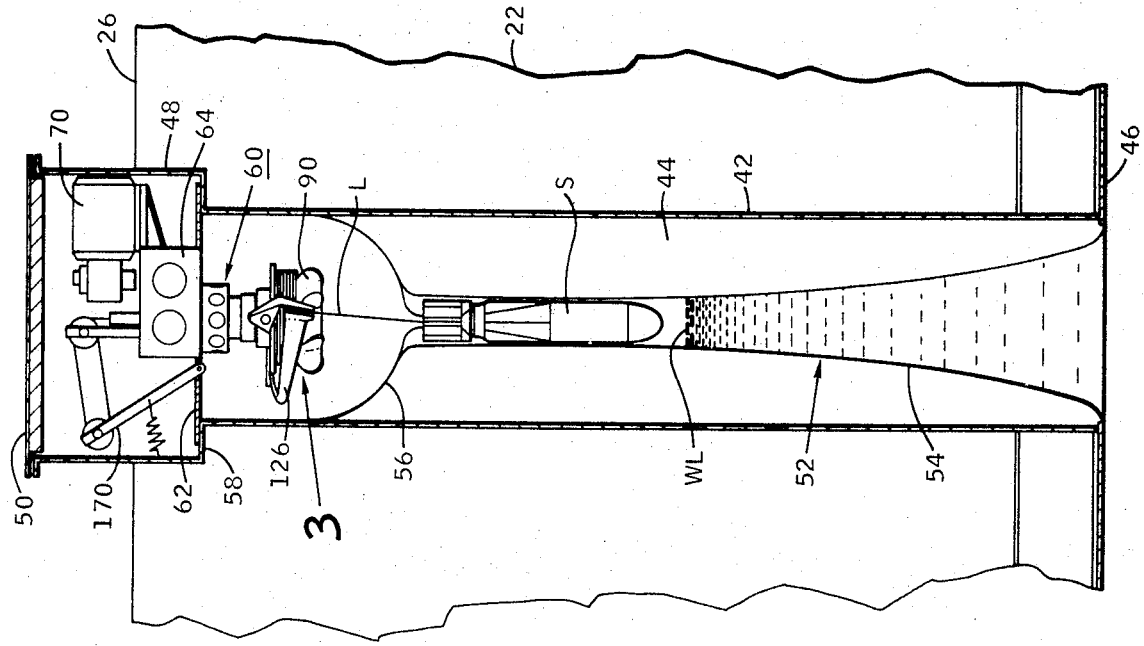
FIG. 2 is an enlarged longitudinal sectional view through the buoy hull taken on the line 2—2 of FIG. 1 showing the winch in elevation.

Referring to FIG. 2, hull 22 is fitted with a cylindrical wall or tube 42 defining a through hull opening 44. Tube 42 joins to the lower surface 46 of the hull 22 as by welding, extending upwardly therefrom to a position slightly below the level of the deck 26. A winch housing 48 is joined to the upper end of tube 42 and deck 26 as by welding. Housing 48 preferably projects above the surface of deck 26 to bar passage of deck water into the interior thereof. A hatch 50 hinged to the housing 48 provides ready access means to winch mechanism mounted within the housing 48. Positioned inside the tube 42 is a fairlead member 52 having a lower bellmouth portion 54 communicating with an upper hemispherical portion 56. Fairlead 52 is preferably fabricated from a non-corrosive material such as fiberglass reinforced plastic. The lower portion 54 is joined to the lower surface 46 of the hull 22 and the upper portion 56 is joined to the interior wall surface of the tube 42 at an elevation spaced below the housing 48. Fasteners such as rivets may be used to secure the fairlead to the hull and tube, or if desired, a suitable waterproof adhesive, or a combination of fasteners and adhesive may be substituted therefor.

When utilized as the means aboard a buoy for the automatic deployment and retrieval of an oceanographic sensor, a winch generally designated by the numeral 60 is secured inside the housing 48 as by bolts and nuts or rivets. A mounting plate 62 serves to mount winch 60 onto an inturned ledge 58 of the housing 48 with said bolts and nuts or rivets extending through plate 62 into the ledge 58. Mounting plate 62 secures to a frame or housing 64 of the winch 60, or if desired, may be formed as an integral part of the frame 64. Journaled in bearings in the frame 64 are a pair of vertically disposed, parallelly spaced shafts 66 and 68. Drive shaft 66 is adapted to be rotated by a motor and right angle drive assembly 70 as shown in FIG. 2. A worm gear 72 secured to shaft 66 meshes with a worm wheel 74 secured to a cross-shaft 76. Shaft 76 is journaled in bearings mounted in a pair of parallelly spaced brackets 78 and 80 depending from the frame 64. Secured to shaft 76 adjacent bracket 80 is a cam 82. Cam 82 is a disk-shaped member having an eccentrically positioned roller (not shown) pivotally mounted on, and projecting from the face thereof. A cam follower 84 having a horizontally disposed recess 86, receives the roller of cam 82 within the recess. Set screws 88 secure cam follower 84 to the hollow spool shaft 68. Thus it will be apparent that the rotary motion of the drive shaft 66 is transmitted through worm gear 72, worm wheel 74, and cross-shaft 76. , transforming into reciprocating up-and-down motion of the spool shaft 68 via the cam and cam follower 82, 84. Mounted on the lower end of spool shaft 68 is a spool 90 having an upper flange 92, a hub portion 94, and a lower bulbous flange 96. A plurality of circumferentially spaced snags or lugs 98 protrude beyond the periphery of the flange 96 to pick up the line L during sensor retrieval as will be hereinafter more fully described. Spool 90 is secured onto the lower end of the shaft 68 by a nut 100 bearing against the undersurface thereof and engaging the threaded end 102 of the shaft 68. Level wind of the sensor line L onto the spool hub 94 is achieved as a result of the up-and-down reciprocal movement of the spool 90 as the line is being wound thereon.

Winding of the sensor line L onto the spool is accomplished through a rotating bail mechanism. A spur gear 104 is secured to drive shaft 66 below worm gear 72. In mesh with gear 104 is a spur gear 106 secured to the driving element of an adjustable-torque slip clutch 108. Clutch 108 is of a conventional design embodying means for varying the transmitting torque to suit the requirements of a particular installation. Exemplary of such a clutch is the Hilliard Slip Clutch manufactured by The Hilliard Corporation of Elmira, New York. Clutch 108 is journaled for rotation about the spool shaft 68 on suitable sleeve type bearings 110. A roller bearing 112 journals the driving element of clutch 108 in the frame 64. The driven element of clutch 108 is keyed to the upper end of a tubular bail shaft 114 which is also journaled about spool shaft 68 on similar type sleeve bearings to bearings 110. Upper and lower roller bearings 116 journal bail shaft 114 in the frame 64. Secured to the lower end of bail shaft 114 directly above upper flange 92 of the spool 90 is a plate or bail platform 118. Diametrically aligned bearings 120 secured to the upper surface of plate 118, journal a pair of stub shafts 122 and 124 of a bail member 126. Opposite ends 128 and 130 of bail member 126 are fixed to a hinge plate 132 and guard plate 134 respectively. Plate 132 and guard plate 134 are in turn secured to stub shafts 122, 124 respectively. Positioned intermediate bail end 130 and guard plate 134 is a sheave 136 journaled for rotation about the axis of a bearing or bolt 138. The flange of sheave 136 adjacent bail end 130 is preferably of a diameter equal to, or slightly less than that of bail end 130 in order to effect smooth transfer of the sensor line L from the bail end over the sheave flange and into the trough or hub of sheave 136 during line retrieval operations. It is preferred that the diameter of the sheave 136 be relatively large in order to achieve maximum service life of the sensor line thus reducing line fatigue resulting from repeated flexing or bending thereof during retrieval. It will be noted that bail member 126 when in its line retrieval position as shown in FIGS. 3 and 4, is of helix configuration with end 128 thereof being elevated above end 130 to effect a declining ramp towards the sheave 136. Referring to FIG. 4, it will be apparent that due to sheave 136 being horizontally spaced relative to stub shafts 122, 124, tension load applied on line L will maintain bail 126 in its line retrieval position. A spring 140 urges bail member 126 in retrieval and deployment positions by overcenter action. One end 142 of spring 140 anchors to a bracket 144 secured to plate 118. Spring end 142 is horizontally spaced from stub shaft 124. At its opposite end 146, spring 140 attaches to guard plate 134 at a position vertically spaced above stub shaft 124. Thus upon pivotal movement of bail 126, spring 140 is torqued while the end 146 thereof describes an arc about the axis of stub shaft 124. Upon end 146 passing overcenter spring 140 urges bail 126 to the retrieval or deployment position.

Retrieval and deployment of sensor line L is effected by pivoting the bail member 126 about the axis of the stub shafts while the bail is being rotated about the spool axis. Pivoting of the bail 126 is achieved through a striker device generally designated by the numeral 148. Striker device 148 comprises a pair of strikers 150 and 152 secured to stub shaft 124 and a pair of striker plates 154 and 156 secured to a shaft 158. Shaft 158 is journaled in bearings fixed to the frame 64 above the strikers 150, 152. A rotary solenoid 160 connects to shaft 158 through a series of links 162, 164, and 166. A torsion spring 168 normally maintains the striker plates 154, 156 in the position as shown (line retrieval) in FIGS. 3 and 4. In this position, striker plate 156 is pivoted upwards out of interference with its corresponding striker 152 and striker plate 154 is projected downward into striking position. As shown, striker 150 has been tripped to position bail 126 for line retrieval.

With reference to FIG. 2, it will be observed that a payload or sensor S has been retrieved by the winch 60 into the fairlead 52 above the waterline WL. Line L attaches at one end thereof to sensor S, level winding upon spool 90, passing upwardly through the hollow center of spool shaft 68, to engage the reels of a spring-biased snubber device 170. A typical snubbing device 170 is herein illustrated only by way of an example and does not constitute a part of the present invention since any suitable shock absorbing device is contemplated that will reduce the shock load on the line L upon sensor S reaching its full deployment.

The operation of the winch 60 of the present invention will be hereinafter described in detail with reference to its application in a buoy or the like for deploying and retrieving an oceanographic sensor.

Upon activation of motor 70 to deploy sensor S, drive shaft 66 rotates bail shaft 114 through gears 104, 106, and clutch 108 in a counterclockwise direction as viewed in plan. Simultaneously with the activation of motor 70 is the energization of solenoid 160 pivoting the striker plates 154, 156 about the axis of shaft 158 via links 162, 164, and 166. Striker plate 154 is thus retracted into a non-interfering horizontal plane while striker plate 156 is deployed into a vertical plane directly in the path of the striker 152 of the bail 126. Continued rotation of bail 126 about the axis of shaft 68 results in striker 152 engaging striker plate 156 to pivot bail 126 in a counterclockwise direction about the axis of stub shafts 122, 124 into a position approximately 180° from that as shown in FIG. 4. With bail 126 shifted to the opposite side of spool 90, sensor S is free to gravitate out of fairlead 52 into the ocean. The weight of sensor S unwinds line L from the spool hub 94 until such time as line L is completely separated or unwound from the spool. Thereafter sensor S receives no physical support from the winch 60 since line L passes through hollow shaft 68 attaching to surface electronics via the snubber device 170. The torsion spring 168 connected to linkage 164, 166 serves to return the striker plates 154, 156 to their original position as shown in FIG. 4 subsequent to the shifting of the bail to its deployment position.

The retrieval operation is initiated by reversing direction of the motor 70. Through drive shaft 66, gears 104, 106, and clutch 108, bail shaft 114 is rotated in a clockwise direction about the vertical axis of shaft 68. As hereinbefore described, striker 150 is in raised position and striker 152 has been lowered as a result of the deployment operation. Thus in the initial revolution of bail 126, striker 150 engages striker plate 154 pivoting bail 126 about the axis of stub shafts 122, 124 and returning it to the retrieval position of FIG. 4. During transition, bail 126 picks up line L as it intersects the vertical centerine of the spool axis. In full retrieval position, the helical form of bail 126 forms a decline upon which line L gravitates onto the sheave 136. As bail 126 rotates about the axis of its shaft, line L slides along the undersurface of the bulbous flange 96 of spool 90 until snagged by one of the protrusions or lugs 98. Continued rotation of the bail level winds line L onto the spool hub 94 as the spool is vertically reciprocated.

Concurrent with the rotation of bail 126, spool 90 is reciprocated to helically wind line L up-and-down across the face of hub 94 of the spool in layer upon layer windings. Reciprocation of spool shaft 68 is effected through engagement of the eccentrically positioned roller of cam disk 82 with the horizontally disposed slot 86 in cam follower 84. Accordingly due to the geared connection 72, 74 with drive shaft 66, cam disk and follower 82, 84 reciprocates spool shaft 68 and spool 90 in an up-and-down linear motion to level wind line L thereon.

It will be noted that the present invention provides for the maximum service life of sensor line L by utilizing generous radii on all surfaces in contact therewith.

Exemplary of such is sheave 136, the flared bore of the spool retaining nut 100, the bulbous flange 96 of spool 90, and the radiused and canted surfaces of the line pick-up snags or lugs 98 of the spool 90.

Referring to FIG. 5, there is shown a modified form of striker and striker plate device generally designated 248. In this arrangement a striker 250 is loosely pivoted on stub shaft 124 intermediate a pair of spaced bearings 120. Connection of striker 250 to stub shaft 124 is afforded by a pin 252. Pin 252 is fixed to shaft 124 and projects radially therefrom through a slotted opening 254 in striker 250 to engage one or the other ends of slot 254. Centering springs 256, 258 normally maintain striker 250 in vertical or upright position. One end of the springs 256, 258 secures to striker 250 and the opposite end thereof secures to plate 118. A striker plate 260 comprises a roller 262 journaled in a bracket 264 in turn fixed to frame 64.

In the operation of the winch 60 to deploy sensor S, plate 118 is rotated in a counterclockwise direction as indicated by the arrow 266 by the mechanism as previously described in connection with the embodiment shown in FIGS. 3 and 4. Continued rotation of plate 118 after initial contact between striker 250 and roller 262, pivots striker 250 counterclockwise about the axis of stub shaft 124 against the bias of centering spring 258. As a result of contact between pin 252 and one end of slot 254, stub shaft 124 together with guard plate 134 and bail 126 are pivoted in a counterclockwise direction concurrently with the movement of striker 250. As hereinbefore described spring 140 (FIG. 4) biases bail 126 to its retrieval and deployment positions. Consequently spring 140 completes the rotation of bail 126 to full deployment position following initial action by the striker device 248. After striker 250 has passed beneath roller 262, centering spring 258 returns it to the neutral or vertical position as shown in FIG. 5. However, in the fully deployed position, pin 252 of stub shaft 124 will rest against the opposite end (not shown) of slot 254.

In the retrieval operation of the FIG. 5 embodiment, plate 118 rotates in a clockwise direction in the manner as described in connection with FIGS. 3 and 4. Thus striker 250 engages roller 262 from the direction opposite to that illustrated in FIG. 5, pivoting in a clockwise direction as it passes therebeneath. By action of spring 140, bail 126 is retained in deployment position with the pin 252 of stub shaft 124 thereof engaged with the opposite end of slot 254 to that shown in FIG. 5. Upon striker 250 being pivoted clockwise, stub shaft 124 is rotated through its slot and pin connection to return bail 126 to its line pick-up position.

Other modifications, applications and ramifications of the present invention will become apparent to those skilled in the art upon reference to this disclosure. It is intended that such be included within the scope of this invention as defined in the appended claims.

We claim:

1. A winch comprising:
   a frame,
   a spool having a substantially vertical axis supported by said frame,
   means defining a vertical passage through said spool,
   a line secured to structure above said spool projecting through said passage,
   a plate journaled for rotation about the axis of said spool,
   a bail pivotally mounted on said plate,
   said bail being pivotal through an arc intersecting said vertical axis,
   striker means mounted on said frame,
   said striker means pivoting said bail to pick up said line upon rotation of said plate in one direction, and
   said striker means pivoting said bail to release said line upon rotation of said plate in an opposite direction.

2. The winch of claim 1 wherein:
   said spool is provided with protrusions to snag said line for winding onto the body of said spool.

3. The winch of claim 1 wherein:
   drive and transmission means are coupled to said spool and said bail to reciprocate said spool vertically and rotate said bail about said vertical axis.

4. The winch of claim 3 wherein:
   a clutch connects said bail to said drive means.

5. The winch of claim 4 wherein:
   biasing means maintains said bail in line pick-up and line release positions.

6. The winch of claim 5 wherein:
   a rotatable sheave is journaled on said bail to receive said line for winding onto said spool.

7. The winch of claim 6 wherein:
   said bail in its line pick-up position, forming a ramp to direct said line onto said sheave.

8. A winch comprising:
   a frame,
   a shaft mounted for vertical reciprocal movement on said frame,
   a spool secured to the lower end of said shaft,
   means defining a vertically disposed opening through said shaft and spool,
   a line passing through said vertical opening,
   a bail shaft telescopically journaled for rotation about said spool shaft,
   a plate secured to said bail shaft above said spool,
   a bail pivotally mounted on said frame,
   said bail being pivoted by engagement with said striker means to pick up said line for winding onto said spool by rotation of said bail shaft in one direction, and
   said bail being pivoted by engagement with said striker means to release said line by rotation of said bail shaft in an opposite direction.

9. The winch of claim 8 wherein:
   protrusions on the lower flange of said spool snag said line for winding onto the body thereof.

10. The winch of claim 8 wherein:
    drive and transmission means are coupled to said spool shaft and said bail shaft to reciprocate said spool and concommittently rotate said bail.

11. The winch of claim 8 wherein:
    a clutch couples coextensive sections of said bail shaft together to provide for differential rotation of one section relative to an adjacent section thereof.

12. The winch of claim 8 wherein:
    an actuator linked to said striker means pivots striker plates thereof into and out of engagement with said bail, 13. The winch of claim 8 wherein:
    overcenter biasing means maintains said bail in pick-up and line release positions.

14. The winch of claim 8 wherein:

said bail comprises a substantially C-shaped member of tapering cross-section,
a guard plate secured to the larger in cross-section end of said C-shaped member,
said guard plate linking said C-shaped member to said pivotal mounting on said plate, and
said C-shaped member declining in its line pick-up position from its smaller in cross-section end to its larger in cross-section end.

15. The winch of claim 14 wherein:
a sheave is rotatably journaled on said larger in cross-section end of said bail adjacent said guard plate to receive said line for winding onto said spool.

16. The winch of claim 15 wherein:
the cross-sectional configuration of said sheave is commensurate and coextensive with said decline of said C-shaped bail member.

* * * * *